(12) United States Patent
Mihara et al.

(10) Patent No.: US 7,923,493 B2
(45) Date of Patent: Apr. 12, 2011

(54) RUBBER COMPOSITION

(75) Inventors: Satoshi Mihara, Hiratsuka (JP); Rabin N. Datta, Enschede (NL); Auki G. Talma, Enschede (NL); Jacques W. Noordermeer, Enschede (NL)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/528,021

(22) PCT Filed: Dec. 19, 2007

(86) PCT No.: PCT/JP2007/075050
§ 371 (c)(1),
(2), (4) Date: Aug. 20, 2009

(87) PCT Pub. No.: WO2008/102513
PCT Pub. Date: Aug. 28, 2008

(65) Prior Publication Data
US 2010/0048775 A1   Feb. 25, 2010

(30) Foreign Application Priority Data
Feb. 21, 2007   (JP) .................. 2007-041005

(51) Int. Cl.
*C08K 5/00*   (2006.01)
*C08K 5/34*   (2006.01)
(52) U.S. Cl. .......................... 524/87; 524/92
(58) Field of Classification Search .......... 524/87, 524/92
See application file for complete search history.

(56) References Cited

FOREIGN PATENT DOCUMENTS

| | | |
|---|---|---|
| DE | 69113004 T2 | 4/1996 |
| EP | 0489921 A1 | 6/1992 |
| JP | 10-182885 A | 7/1998 |
| JP | 2005-112921 A | 4/2005 |
| JP | 2006-509851 A | 3/2006 |
| JP | 2007-119628 A | 5/2007 |
| JP | 2007-269964 A | 10/2007 |
| WO | WO-92/00350 A1 | 1/1992 |
| WO | WO-2004-052983 A1 | 6/2004 |

OTHER PUBLICATIONS

English translation of Office Action dated Mar. 1, 2010 in counterpart German Application DE 11 2007 003 366.5-43.

*Primary Examiner* — Peter D Mulcahy
(74) *Attorney, Agent, or Firm* — Connolly Bove Lodge & Hutz LLP

(57) ABSTRACT

A rubber composition containing 100 parts by weight of a diene-based rubber, 20 to 120 parts by weight of silica, a sulfur-containing silane coupling agent of 3 to 15% by weight, based upon the weight of the silica and a tertiary amine compound having the formula (I):

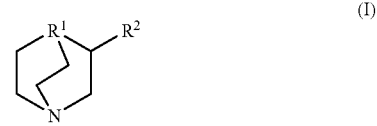

wherein, $R^1$ indicates a carbon atom or nitrogen atom and, when $R^1$ is a carbon atom, $R^2$ indicates a hydrogen atom or hydroxyl group and
having a pKa value of 6.5 to 13.

1 Claim, No Drawings

RUBBER COMPOSITION

CROSS REFERENCE TO RELATED APPLICATIONS

This application is a national phase of PCT/JP2007/075050, filed on Dec. 19, 2007 which claims priority to JP 2007-041005 filed Feb. 21, 2007, the entire contents of all are hereby incorporated by reference.

TECHNICAL FIELD

The present invention relates to a rubber composition, more particularly relates to a rubber composition capable of improving the unvulcanized properties (e.g. Mooney viscosity and scorch resistance) of the rubber composition, capable of improving the viscoelastic properties and abrasion resistance of the vulcanized rubber, and enabling the simple production thereof, without compounding diphenyl guanidine (DPG) or while reducing the amount of DPG.

BACKGROUND ART

Along with the higher performance and more sophisticated functions of automobiles, the performance required to tires has become greater with each passing year. Development in tires, while maintaining the grip on a wet road surface, that is, the wet grip, providing low fuel consumption has been strongly desired, as one of the requirements. The reinforcing filler which had been used for tire treads in the past was carbon black, but recently, due to the above demand, ultrafine silcia particles having a better low hysterisis loss and wet skid resistance performance, compared with carbon black, have begun to be used as a reinforcing filler for tire treads (e.g., see U.S. Pat. No. 5,227,425). However, silica-based fillers have hydrophilic silanol groups on the surface thereof, and therefore, is inferior in affinity with rubber molecules, compared with carbon black. Thus, silica-based fillers are superior in the low hysteresis and wet skid performance, but have the problem that the reinforcibility or abrasion resistance are not sufficient when compared with carbon blacks. Therefore, to make the reinforcibility of silica-based fillers to the same extent as that of carbon black, a silane coupling agent chemically bonding to rubber molecules and the surface of silica particles and capable of increasing the reinforcibility has been jointly used (e.g., see U.S. patent application Ser. No. 467,583). As a representative silane coupling agent, bis(3-triethoxysilylpropyl) tetrasulfide may be mentioned.

However, there is the problem that, when a silane coupling agent is compounded into a silica-containing rubber composition, if the coupling reaction between the silica and the silane coupling agent is insufficient, a good dispersibility of silica cannot be obtained, while if the coupling reaction is excessive, rubber scorching is caused to decrease the quality of the rubber composition. Therefore, according to the conventional kneading method, the rubber temperature is constantly measured by a thermocouple, etc. during the kneading operation, the rubber temperature is maintained in a constant range and the kneading operation is carried out within an empirically set period of time, but the amount of reaction of the silica and silane coupling agent does not necessarily have to be constant in each batch of the product. Thus, balancing the mixability and proccessability of silica with respect to the desired rubber properties is very difficult.

As a matter of fact, in silica-containing rubber compositions, diphenyl guanidine (DPG) is frequently used, as a conventional vulcanization accelerator. In recent years, its toxicity and the adverse effects on rubber steel cord bonding have become a concern. There is, therefore, a movement to decrease the using amount of DPG. However, in a rubber composition containing a large amount of silica, there was the problem that, if the using amount of DPG is decreased, the vulcanization rate is decreased and the dispersion of the silica in the rubber is deteriorated.

Japanese Patent Publication (A) No. 2005-112921 discloses that by compounding a secondary amine compound having a piperidine skeleton, i.e., 2,2,6,6-tetramethylpiperidine or its derivative into a diene-based rubber, it is possible to obtain a rubber composition having a high grip performance, but this publication does not describe the compounding of this compound together with silica, and therefore, there are no description as to the dispersability or processability of silica.

Japanese Patent Publication (A) No. 2006-509851 describes a vulcanized product exhibiting excellent mechanical properties, while maintaining the allowable vulcanization rate even when no secondary vulcanization accelerator is added, is obtained by compounding an organic quaternary ammonium salt into a diene elastomer polymer, together with silica or the other additives to a rubber composition. This Publication describes the use of 1,4-diazabicyclo[2,2,2]octane for preparation of an organic quaternary ammonium salt (see Examples 1 and 2), but does not describe at all that 1,4-diazabicyclo[2,2,2]octane is compounded into a rubber composition.

DISCLOSURE OF THE INVENTION

Accordingly, the object of the present invention is to provide a rubber composition capable of solving the problems of the decrease, in the vulcanization rate and deterioration of dispersion of the silica in the rubber, while decreasing the amount of use of DPG in the rubber composition, or without using DPG.

In accordance with the present invention, there is provided a rubber composition comprising 100 parts by weight of a diene-based rubber, 20 to 120 parts by weight of silica, a sulfur-containing silane coupling agent in an amount of 3 to 15% by weight of the weight of the silica, and a tertiary amine compound having the formula (I):

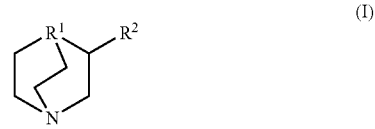

wherein $R^1$ indicates a carbon atom or nitrogen atom and, when $R^1$ is a carbon atom, $R^2$ indicates a hydrogen atom or hydroxyl group and
having a pKa value of 6.5 to 13.

As the tertiary amine compound having the formula (I) used in the rubber composition of the present invention, preferably at Least one tertiary amine compound selected from (i) 1-azabicyclo[2,2,2](quinuclidine) having the formula (II):

(ii) 1-azabicyclo[2,2,2]-3-ol(3-quinuclidinol) having the formula (III):

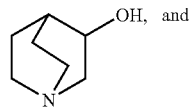

(III)

(iii) 1,4-diazabicyclo[2,2,2]octane (DABCO) having the formula (IV):

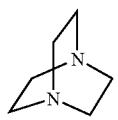

(IV)

may be used.

According to the present invention, the problems arising due to the decrease in the amount of use of DPG, of which toxicity and of which detrimental effect on the bonding of rubber/steel cord have become a concern in Europe in recent years, i.e., the problems of the decrease in the vulcanization rate and the deterioration of dispersion of silica in the rubber composition, are solved by compounding a tertiary amine-based compound having the formula (I), particularly quinuclidine having the formula (II), quinuclidinol having the formula (III) and/or DABCO having the formula (IV), into a silica-containing rubber composition, whereby the vulcanization rate, the dispersion of silica in the rubber composition and reinforcibility, and viscoelastic properties of the rubber composition are improved and the amount of DPG added can be decreased.

BEST MODE FOR CARRYING OUT THE INVENTION

The inventors engaged in research to solve the above-mentioned problems and, as a result, found that, by compounding a tertiary amine-based compound having the formula (I) into a rubber composition comprising a diene-based rubber, in which silica is compounded, it is possible to improve the vulcanization rate of the rubber composition, the dispersion and the reinforcibility, of the silica, and further the viscoelastic properties and possibility for replacing the use of DPG.

According to the present invention, into 100 parts by weight of a diene-based rubber, silica is compounded in an amount of 20 to 120 parts by weight, preferably 40 to 80 parts by weight, a sulfur-containing silane coupling agent is compounded in an amount of 3 to 15% by weight of the weight, preferably 5 to 10% by weight, based upon the weight of silica and a tertiary amine-based compound having the formula (I) and having a pKa value of 6.5 to 13, preferably 8 to 13 is compounded.

As the diene-based rubber usable in the rubber composition of the present invention, natural rubber (NR), polyisoprene rubber (IR), polybutadiene rubber (BR), styrene-butadiene copolymer rubber (SBR), acrylonitrile butadiene rubber, ethylene-propylene-diene copolymer rubber, styrene-isoprene copolymer rubber, isoprene-butadiene copolymer rubber, etc. may be mentioned. These may be used alone or in any blends thereof.

As the silica usable in the rubber composition of the present invention, it is possible to use any silica conventionally compounded into a rubber composition for tires and other rubber products. If the amount of silica is small, not only are the strength and abrasion resistance insufficient, but also both the wet abrasion strength due to the incorporation of silica and the low heat buildup are insufficiently simultaneously achieved, while conversely if the amount is large, the mixability is decreased and the heat buildup is increased, and therefore, this not preferable.

As the sulfur-containing silane coupling agent usable in the rubber composition of the present invention, among those compounded together with the silica in the past, preferably any one containing a sulfur atom in the molecule may be used. For example, 3-trimethoxysilylpropyl-N,N-dimethylcarbamoyl-tetrasulfide, trimethoxysilylpropyl mercaptobenzothiazole tetrasulfide, triethoxysilylpropyl, methacrylate monosulfide, dimethoxymethylsilylpropyl-N,N-dimethylthiocarbamoyl tetrasulfide, bis-[3-(triethoxysilyl)propyl]tetrasulfide, bis-[3-(triethoxysilyl)propyl]disulfide, 3-mercaptopropyltrimethoxysilane, etc. may be used. These are known compounds. Numerous products are commercially available. If the amount of the silane coupling agent is small, the strength of the rubber and the abrasion resistance are liable to be decreased due to the insufficient reinforcibility of the silica and therefore, this is not preferred, while conversely if large, scorching is liable to occur during processing, and therefore, this is not preferred either.

The amount of the tertiary amine compound having the formula (I), when used alone or together with DPG, in terms of the total weight, is preferably 0.1 to 3.0 parts by weight, more preferably 0.5 to 2.5 parts by weight, based upon 100 parts by weight of the rubber. The tertiary amine compound having the formula (I) is preferably added in the rubber composition simultaneously with the silica and the silane coupling agent and kneaded and mixed at the stage of the silanization reaction (i.e., the reaction of silica and silane coupling agent).

The quinuclidine and quinuclidinol having the formulae (II) and (III) are commercially available products and do not have to be specially synthesized. For example, they can be obtained from BUCHLER GmbH (Germany) (quinuclidine) and ABCR GmgH & Co. KG (Germany) (quinuclidinol). Further, the DABCO having the formula (IV) is also commercially available. For example, it can be obtained as BABCO from Tokyo Chemical Industry Co., Ltd.

DPG is generally used in rubber compositions containing silica, since it has the following advantages.

(1) The decrease in vulcanization rate due to the acidity of silica can be suppressed by the use thereof as a secondary vulcanization accelerator.

(2) Due to the interaction thereof with the silica surface, the undesired agglomeration of silica particles can be prevented and the Payne effect (i.e., the increase in storage modulus due to the interaction between silica particles) can be reduced and the reinforcibility can be increased by the acceleration of silanization.

However, as explained above, in recent years, DPG is becoming a concern due to its toxicity and its detrimental effect on the rubber/steel cord bonding. The decrease in the use amount of DPG or the finding of the alternatives is becoming a major issue in this field.

The inventors took note of the compounds having a large pKa value in an amine-based compounds as an alternative of DPG. In a silanization reaction (i.e., reaction of silica-silane coupling agent), the hydrolysis rate of the silane coupling agent becomes important. The amine compound promotes this hydrolysis by a two-molecule type nucleophilic substitution reaction (SN2). In particular, in a tertiary amine compound, the nitrogen atoms are all bonded with the alkyl chain, while the alkyl groups are high in electron donor property and remarkably improve the nucleophilicity of nitrogen atoms. As a result, these promote the silanization. Further, in general, the acidity (pH) of the silica surface is about 6 to 7. To promote the silanization reaction, it is important to make the pKa value larger than the pH of the silica surface.

The tertiary amine compounds preferably used in the present invention are quinuclidine (pKa=11.5), 3-quinuclidinol (pKa=10.1) and DABCO (pKa=8.8). These compounds can promote the silanization reaction and reduce the Payne effect due to the high nucleophilicity. Further, these compounds have, as one of their major merits, the lack of any detrimental effect on the vulcanization rate, even if they are used in place of DPG. Note that said tertiary amine compounds are not particularly a problem, in terms of the toxicity either, because they are already used, as starting materials for synthesis of pharmaceuticals.

The silica-compounding rubber composition according to the present invention may include, in addition to the above essential ingredients, fillers such as carbon black, a vulcanization or cross-linking agent, a vulcanization accelerator, various types of oil, an antioxidant, a plasticizer, and other various types of additives generally added for rubber compositions for tires, etc. The additives are kneaded by a general method to form a composition which is then used for vulcanization or cross-linking. The amounts of these additives can be made the generally added amounts, so long as the objects of the present invention are not adversely affected.

EXAMPLES

Examples will now be illustrated for further explaining the present invention, but the scope of the present invention is by no means limited to these Examples.

Standard Example 1 and Examples 1 to 39

Preparation of Samples

In each of the formulations shown in Tables I to VI, the components, other than the vulcanization accelerator and sulfur, were kneaded by a 0.39 liter internal mixer for 9 minutes. When reaching 150° C., the mixture was discharged to obtain a master batch. Note that, in the row of "charging method" in the Tables, "NP" indicates the kneading of the tertiary amine compound in the internal mixer, while "FN" indicates the kneading of the tertiary amine compound at the same time with the vulcanization accelerator and sulfur on an open mill. The vulcanization accelerator and sulfur were kneaded into the above master batch on an open mill to obtain the rubber composition. The rubber composition thus obtained was used to evaluate the unvulcanized physical properties by the test methods shown below. The results are shown in Tables I to VI.

Next, the rubber composition obtained above was vulcanized in a 15×15×0.2 cm mold at 160° C. for a vulcanization time of T95 determined by an ODR (oscillating disk rheometer) based on ASTM D2084 to prepare a vulcanized rubber sheet. The physical properties of the rubber compositions were determined by the test method shown below were determined. The results are shown in Tables I to VI.

Test Methods for Evaluation of Rubber Physical Properties

The physical properties are all shown indexed to the Standard Example 1 as 100. The larger this index, the better the physical properties.

T05: Scorch time determined based on ASTM D2084 by ODR (measurement temperature: 125° C.)

T95: Determined based on ASTM D2084 by ODR (measurement temperature: 160° C.). The larger this index, the faster the vulcanization rate indicated.

Dispersion index (G' at 0.56%): G' (0.56%) measured based on ASTM D6204 at RPA2000. The larger this index, the better the Payne effect shown.

Reinforcing index (M300/M100): Tensile test conducted based on ASTM K6251 and a ratio of the 300% modulus (M300) and the 100% modulus (M100) (M300/M100) used as reinforcing index. The larger the value, the larger the reinforcibility indicated.

Rolling resistance index: tan δ (60° C.) measured as intermediate physical amount. tan δ (60° C.) measured using viscoelastic spectrometer made by Toyo Seiki Co. under the conditions of frequency of 20 Hz, initial strain of 10%, dynamic strain of ±2% and temperature of 60° C. The larger the value, the lower the rolling resistance.

TABLE I

|  | Standard Ex. 1 | Ex. 1 | Ex. 2 | Ex. 3 | Ex. 4 |
|---|---|---|---|---|---|
| Formulation (parts by weight) | | | | | |
| Quinuclidine*[1] | — | 1 | — | 2 | — |
| Quinuclidinol*[2] | — | — | 1 | — | 2 |
| DPG*[3] | 2 | 1 | 1 | — | — |
| Charging method | NP | NP | NP | NP | NP |
| Physical properties | | | | | |
| T05 | 100 | 100 | 102 | 101 | 101 |
| T95 | 100 | 106 | 104 | 112 | 110 |
| Dispersion index | 100 | 113 | 110 | 125 | 120 |
| Reinforcing index (M300/M100) | 100 | 112 | 109 | 120 | 116 |
| Rolling resistance index | 100 | 106 | 104 | 110 | 107 |

*[1]Quinuclidine made by Aldrich
*[2]3-Quinuclidinol made by Aldrich
*[3]PERKACIT DPG made by Flexisys B.V.

Rest of Formulation (Parts by Weight) (Common to All Examples)

| | |
|---|---|
| SBR (VSL5025 HM-1) (BUNA VSL5025HM-1 made by LANXCESS) | 103 |
| BR (CB24) (BUNA CB24 made by LANXCESS) | 25 |
| Silica (1165MP) (Zeosil 1165MP made by Rhodia) | 80 |
| Carbon black (HAF) (Seast KH made by Tokai Carbon) | 10 |
| TESPT (Si69) (Si69 made by Degussa) | 7.07 |
| Stearic acid (made by Merck) | 2.5 |
| ZnO (made by Merck) | 2.5 |
| 6PPD (Santoflex 13 made by Flexisys B.V.) | 1.5 |
| Sulfur (made by J. T. Baker) | 1.4 |
| CBS (Santocure CBS made by Flexisys B.V.) | 1.7 |

TABLE II

| | Standard Ex. 1 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|
| Formulation (parts by weight) | | | | | | | | | | | |
| Quinuclidine*[1] | — | 2 | — | 0.5 | 2.7 | — | — | 0.05 | — | 2 | — |
| Quinuclidinol*[2] | — | — | 2 | — | — | 0.5 | 2.7 | — | 0.05 | — | 2 |
| DPG*[3] | 2 | — | — | — | — | — | — | — | — | 2 | 2 |
| (Qine + Qnol) + DPG | 2 | 2 | 2 | 0.5 | 2.7 | 0.5 | 2.7 | 0.05 | 0.05 | 4 | 4 |
| Charging method | NP | NP | NP | NP | NP | NP | NP | NP | NP | NP | NP |
| Physical properties | | | | | | | | | | | |
| T05 | 100 | 102 | 101 | 103 | 100 | 102 | 100 | 104 | 105 | 93 | 95 |
| T95 | 100 | 112 | 110 | 102 | 115 | 101 | 112 | 98 | 96 | 120 | 116 |
| Dispersion index | 100 | 125 | 120 | 104 | 112 | 102 | 108 | 103 | 101 | 128 | 124 |
| Reinforcing index (M300/M100) | 100 | 120 | 116 | 102 | 108 | 101 | 107 | 102 | 101 | 115 | 110 |
| Low rolling resistance index | 100 | 110 | 107 | 101 | 106 | 100 | 105 | 101 | 100 | 113 | 110 |

*[1]Quinuclidine made by Aldrich
*[2]3-Quinuclidinol made by Aldrich
*[3]PERKACIT DPG made by Flexisys B.V.

Rest of Formulation (Parts by Weight) (Common to All Examples)

| | |
|---|---|
| SBR (VSL5025) (BUNA VSL5025 made by LANXCESS) | 103 |
| BR (CB24) (BUNA CB24 made by LANXCESS) | 25 |
| Silica (1165MP) (Zeosil 1165MP made by Rhodia) | 80 |
| Carbon black (HAF) (Seast KH made by Tokai Carbon) | 10 |
| TESPT (Si69) (Si69 made by Degussa) | 7.07 |
| Stearic acid (made by Merck) | 2.5 |
| ZnO (made by Merck) | 2.5 |
| 6PPD (Santoflex 13 made by Flexisys B.V.) | 1.5 |
| Sulfur (made by J. T. Baker) | 1.4 |
| CBS (Santocure CBS made by Flexisys B.V.) | 1.7 |

TABLE III

| | Standard Ex. 1 | Ex. 15 | Ex. 16 | Ex. 17 | Ex. 18 |
|---|---|---|---|---|---|
| Formulation (parts by weight) | | | | | |
| Quinuclidine*[1] | — | 2 | — | 2 | — |
| Quinuclidinol*[2] | — | — | 2 | — | 2 |
| DPG*[3] | 2 | — | — | — | — |
| (Qine + Qnol) + DPG | 2 | 2 | 2 | 2 | 2 |
| Charging method | NP | NP | NP | FN | FN |
| Physical properties | | | | | |
| T05 | 100 | 102 | 101 | 102 | 101 |
| T95 | 100 | 112 | 110 | 106 | 107 |
| Dispersion index | 100 | 125 | 120 | 96 | 95 |
| Reinforcing index (M300/M100) | 100 | 120 | 116 | 98 | 96 |
| Low rolling resistance index | 100 | 110 | 107 | 98 | 97 |

*[1]Quinuclidine made by Aldrich
*[2]3-Quinuclidinol made by Aldrich
*[3]PERKACIT DPG made by Flexisys B.V.

Rest of Formulation (Parts by Weight) (Common to All Examples)

| | |
|---|---|
| SBR (VSL5025 HM-1) (BUNA VSL5025HM-1 made by LANXCESS) | 103 |
| BR (CB24) (BUNA CB24 made by LANXCESS) | 25 |
| Silica (1165MP) (Zeosil 1165MP made by Rhodia) | 80 |
| Carbon black (HAF) (Seast KH made by Tokai Carbon) | 10 |
| TESPT (Si69) (Si69 made by Degussa) | 7.07 |
| Stearic acid (made by Merck) | 2.5 |
| ZnO (made by Merck) | 2.5 |
| 6PPD (Santoflex 13 made by Flexisys B.V.) | 1.5 |
| Sulfur (made by J. T. Baker) | 1.4 |
| CBS (Santocure CBS made by Flexisys B.V.) | 1.7 |

TABLE IV

| | Standard Ex. 1 | Ex. 19 | Ex. 20 | Ex. 21 | Ex. 22 |
|---|---|---|---|---|---|
| DPG*[1] | 2 | 1.5 | 1 | 0.5 | — |
| DABCO*[2] | — | 0.5 | 1 | 1.5 | 2 |
| DPG + DABCO | 2 | 2 | 2 | 2 | 2 |
| Charging method | NP | NP | NP | NP | NP |
| T05 | 100 | 102 | 101 | 100 | 100 |
| T95 | 100 | 101 | 101 | 102 | 105 |
| G' at 0.56% | 100 | 108 | 108 | 113 | 115 |
| M300/M100 | 100 | 105 | 108 | 111 | 112 |
| tanδ (60° C.) | 100 | 102 | 104 | 106 | 107 |

*[1]PERKACIT DPG made by Flexisys B.V.
*[2]1,4diazabicyclo[2,2,2]octane made by Aldrich Rest of Formulation (Parts by Weight) (Common to All Examples)

| | |
|---|---|
| SBR (VSL5025 HM-1) (BUNA VSL5025 made by LANXCESS) | 103 |
| BR (CB24) (BUNA CB24 made by LANXCESS) | 25 |
| Silica (1165MP) (Zeosil 1165MP made by Rhodia) | 80 |
| Carbon black (HAF) (Seast KH made by Tokai Carbon) | 10 |
| TESPT (Si69) (Si69 made by Degussa) | 7.07 |
| Stearic acid (made by Merck) | 2.5 |
| ZnO (made by Merck) | 2.5 |
| 6PPD (Santoflex 13 made by Flexisys B.V.) | 1.5 |
| Sulfur (made by J. T. Baker) | 1.4 |
| CBS (Santocure CBS made by Flexisys B.V.) | 1.7 |

TABLE V

| | Standard Ex. 1 | Ex. 23 | Ex. 24 | Ex. 25 | Ex. 26 | Ex. 27 |
|---|---|---|---|---|---|---|
| DPG*[1] | 2 | — | — | — | — | — |
| DABCO*[2] | — | 0.5 | 1 | 1.5 | 2 | 0.05 |

TABLE V-continued

|  | Standard Ex. 1 | Ex. 23 | Ex. 24 | Ex. 25 | Ex. 26 | Ex. 27 |
|---|---|---|---|---|---|---|
| DABCO + DPG (phr) | 2 | 0.5 | 1 | 1.5 | 2 | 0.05 |
| Charging method | NP | NP | NP | NP | NP | NP |
| T05 |  | 103 | 101 | 101 | 100 | 104 |
| T95 | 100 | 100 | 102 | 104 | 105 | 95 |
| G' at 0.56% | 100 | 101 | 105 | 109 | 115 | 100 |
| M300/M100 | 100 | 102 | 105 | 109 | 112 | 100 |
| tanδ (60° C.) | 100 | 101 | 103 | 105 | 107 | 100 |

*[1]PERKACIT DPG made by Flexisys B.V.
*[2]1,4diazabicyclo[2,2,2]octane made by Aldrich Rest of Formulation (Parts by Weight) (Common to All Examples) Same as formulations of Table IV

TABLE VI

|  | Standard Ex. 1 | Ex. 34 | Ex. 35 | Ex. 36 | Ex. 37 | Ex. 38 |
|---|---|---|---|---|---|---|
| DPG*[1] | 2 | 0.5 | 0.5 | — | 1 | 1 |
| Quinuclidine*[2] | — | 0.5 | — | 0.5 | 0.5 | 0.5 |
| Quinuclidinol*[3] | — | — | 0.5 | 0.5 | 0.5 | — |
| DABCO*[4] | — | 0.5 | 0.5 | 0.5 | — | 0.5 |
| (Qine + Qnol + DABCO) + DPG | — | 1.5 | 1.5 | 1.5 | 2 | 2 |
| Charging method | NP | NP | NP | NP | NP | NP |
| T05 |  | 103 | 104 | 104 | 103 | 102 |
| T95 | 100 | 110 | 108 | 109 | 112 | 111 |
| G' at 0.56% | 100 | 110 | 108 | 111 | 120 | 117 |
| M300/M100 | 100 | 108 | 106 | 109 | 117 | 115 |
| tanδ (60° C.) | 100 | 106 | 105 | 107 | 107 | 106 |

*[1]PERKACIT DPG made by Flexisys B.V.
*[2]Quinuclidine made by Aldrich
*[3]3-Quinuclidinol made by Aldrich
*[4]1,4diazabicyclo[2,2,2]octane made by Aldrich Rest of Formulation (Parts by Weight) (Common to All Examples)

| SBR (VSL5025 HM-1) (BUNA VSL5025HM-1 made by LANXCESS) | 103 |
|---|---|
| BR (CB24) (BUNA CB24 made by LANXCESS) | 25 |
| Silica (1165MP) (Zeosil 1165MP made by Rhodia) | 80 |
| Carbon black (HAF) (Seast KH made by Tokai Carbon) | 10 |
| TESPT (Si69) (Si69 made by Degussa) | 7.07 |
| Stearic acid (made by Merck) | 2.5 |
| ZnO (made by Merck) | 2.5 |
| 6PPD (Santoflex 13 made by Flexisys B.V.) | 1.5 |
| Sulfur (made by J. T. Baker) | 1.4 |
| CBS (Santocure CBS made by Flexisys B.V.) | 1.7 |

INDUSTRIAL APPLICABILITY

The toxicity and detrimental effects on the bonding of rubber/steel cord of DPG have become a concern. Decrease in the amount of use of DPG has become a major issue there. According to the present invention, however, by compounding the tertiary amine-based compound, i.e., quinuclidine and/or quinuclidinol and/or DABCO in a rubber composition containing a diene-based rubber having a silica, filler, it is possible to improve the vulcanization rate, the dispersion of silica, the reinforcibility and the viscoelastic properties and possible to replace the DPG therewith.

The invention claimed is:

1. A rubber composition comprising 100 parts by weight of a diene-based rubber, 20 to 120 parts by weight of silica, 3 to 15% by weight, based upon the weight of the silica of a sulfur-containing silane coupling agent and at least one tertiary amine compound selected from (i) 1-azabicyclo[2,2,2] having the formula (II):

(II)

(ii) 1-azabicyclo[2,2,2]-3-ol(3-quinuclidinol) having the formula (III):

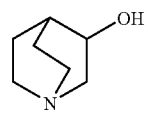

(III)

and (iii) 1,4-diazabicyclo[2,2,2]octane having the formula (IV):

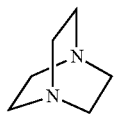

(IV)

wherein the amount of said tertiary amine compound is, based upon 100 parts by weight of the rubber, 0.1 to 3.0 parts by weight, provided that, if diphenyl guanidine is used together, this amount is a total with the amount of the diphenyl guanidine and wherein said tertiary amine compound is kneaded at a stage of a silanization reaction before adding a vulcanization agent.

* * * * *